US012074006B2

(12) United States Patent
Li et al.

(10) Patent No.: US 12,074,006 B2
(45) Date of Patent: *Aug. 27, 2024

(54) RADIATION EMISSION DEVICE

(71) Applicant: SHANGHAI UNITED IMAGING HEALTHCARE CO., LTD., Shanghai (CN)

(72) Inventors: Dun Li, Wuhan (CN); Mingchun Zhai, Wuhan (CN); Guangzhong Bao, Wuhan (CN); Xiao Fang, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 63 days.

This patent is subject to a terminal disclaimer.

(21) Appl. No.: 17/806,732

(22) Filed: Jun. 13, 2022

(65) Prior Publication Data

US 2022/0310352 A1 Sep. 29, 2022

Related U.S. Application Data

(63) Continuation of application No. 17/084,699, filed on Oct. 30, 2020, now Pat. No. 11,361,930, which is a (Continued)

(51) Int. Cl.
*H01J 35/10* (2006.01)
*H05G 1/02* (2006.01)

(52) U.S. Cl.
CPC ........ *H01J 35/106* (2013.01); *H01J 35/1024* (2019.05); *H01J 35/107* (2019.05);
(Continued)

(58) Field of Classification Search
CPC .......... H01J 35/00; H01J 35/10; H01J 35/106; H01J 35/101; H01J 35/105; H01J 35/107;
(Continued)

(56) References Cited

U.S. PATENT DOCUMENTS 3,819,968 A 6/1974 Haberrecker et al.
4,569,070 A 2/1986 Schubert et al.
(Continued)

FOREIGN PATENT DOCUMENTS

CN 1812680 A 8/2006
CN 102723251 A 10/2012
(Continued)

OTHER PUBLICATIONS

The Second Office Action in Chinese Application No. 201780094443.3 mailed on Jun. 15, 2022, 20 pages.
(Continued)

*Primary Examiner* — Jurie Yun
(74) *Attorney, Agent, or Firm* — METIS IP LLC

(57) ABSTRACT

A radiation emission device is provided. The radiation emission device may include a cathode configured to emit an electron beam and an anode configured to rotate on a shaft. The anode may be situated to receive the electron beam from the cathode. The radiation emission device may further include a rotor configured to drive the anode to rotate. The rotor may be mechanically connected to the shaft. The radiation emission device may further include a sleeve configured to support the shaft via at least one bearing. The cathode, the anode, and the rotor may be enclosed in an enclosure that is connected to the sleeve. At least a portion of the sleeve may reside outside the enclosure.

20 Claims, 10 Drawing Sheets

Related U.S. Application Data continuation of application No. 16/023,076, filed on Jun. 29, 2018, now Pat. No. 10,825,637, which is a continuation of application No. PCT/CN2017/099940, filed on Aug. 31, 2017.

(52) U.S. Cl.
CPC ...... *H05G 1/025* (2013.01); *H01J 2235/1006* (2013.01); *H01J 2235/1204* (2013.01); *H01J 2235/1208* (2013.01); *H01J 2235/1262* (2013.01); *H01J 2235/1266* (2013.01)

(58) Field of Classification Search
CPC ........... H01J 35/1024; H01J 2235/1262; H01J 2235/1006; H01J 2235/12; H01J 2235/1204; H01J 2235/1208; H01J 2235/1216; H01J 2235/1283; H01J 2235/1266; H05G 1/02; H05G 1/025
See application file for complete search history.

(56) References Cited

U.S. PATENT DOCUMENTS

| | | | | |
|---|---|---|---|---|
| 5,077,781 | A | 12/1991 | Iversen | |
| 5,416,820 | A | 5/1995 | Weil et al. | |
| 6,385,293 | B1 | 5/2002 | Wandke et al. | |
| 6,519,318 | B1 | 2/2003 | Andrews | |
| 6,778,635 | B1 | 8/2004 | Richardson | |
| 7,386,094 | B2 | 6/2008 | Saint-Martin et al. | |
| 7,697,665 | B2 | 4/2010 | Yonezawa et al. | |
| 7,746,982 | B2 | 6/2010 | Yoshii et al. | |
| 9,305,739 | B2 | 4/2016 | Legall et al. | |
| 11,361,930 | B2 * | 6/2022 | Li | H01J 35/107 |
| 2001/0055365 | A1 | 12/2001 | Yasutake | |
| 2004/0032929 | A1 | 2/2004 | Andrews et al. | |
| 2004/0240614 | A1 | 12/2004 | Tiwari et al. | |
| 2006/0193439 | A1 | 8/2006 | Anno et al. | |
| 2007/0086573 | A1 | 4/2007 | Freudenberger et al. | |
| 2008/0056450 | A1 | 3/2008 | Joshi et al. | |
| 2009/0225951 | A1 | 9/2009 | Wandke et al. | |
| 2010/0322383 | A1 | 12/2010 | Coon et al. | |
| 2014/0314197 | A1 | 10/2014 | Watanabe et al. | |
| 2015/0124936 | A1 | 5/2015 | Anno et al. | |

FOREIGN PATENT DOCUMENTS

| | | | |
|---|---|---|---|
| CN | 203537652 | U | 4/2014 |
| CN | 205863129 | U | 1/2017 |
| JP | S5769153 | U | 4/1982 |
| JP | 2008124039 | A | 5/2008 |

OTHER PUBLICATIONS

Partial Supplementary European Search Report in European Application No. 17923626.0 mailed on Jul. 9, 2020, 14 pages.
International Search Report in PCT/CN2017/099940 mailed on Apr. 25, 2018, 5 pages.
Written Opinion of the International Search Report in PCT/CN2017/099940 mailed on Apr. 25, 2018, 5 pages.
The Extended European Search Report in European Application No. 17923626.0 mailed on Nov. 18, 2020, 16 pages.
First Office Action in Chinese Application No. 201780094443.3 mailed on Nov. 29, 2021, 21 pages.
Notice of Reasons for Rejection in Japanese Application No. 2020-511965 mailed on Aug. 3, 2021, 9 pages.

* cited by examiner

RADIATION EMISSION DEVICE

CROSS-REFERENCE TO RELATED APPLICATION

This application is a Continuation of U.S. patent application Ser. No. 17/084,699, filed on Oct. 30, 2020, which is a Continuation of U.S. patent application Ser. No. 16/023,076, filed on Jun. 29, 2018 (now U.S. Pat. No. 10,825,637), which is a Continuation of International Application No. PCT/CN2017/099940, filed on Aug. 31, 2017, the entire contents of each of which are hereby incorporated by reference.

TECHNICAL FIELD

The present disclosure generally relates to a radiation emission device, and more particularly, to a CT device with a heat dissipation structure.

BACKGROUND

In radiology, electrons may be generated from a cathode and accelerated toward an anode. Radioactive rays (e.g., X-rays) may be generated when the electrons impinge on the anode. The anode may rotate on a shaft that is mounted on a sleeve via a bearing. A large amount of heat may be transferred from the anode to the bearing via, for example, the shaft or thermal radiation. Excessive heat may generate a negative influence on the bearing and may reduce the service life of the bearing. Therefore, it is desired to provide an efficient way to dissipate heat from the bearing.

SUMMARY

In accordance with some embodiments of the disclosed subject matter, a radiation emission device with a heat dissipation structure is provided.

An aspect of the present disclosure relates to a radiation emission device. The radiation emission device may include a cathode configured to emit an electron beam, and an anode configured to rotate on a shaft. The anode may be situated to receive the electron beam. The radiation emission device may further include a rotor configured to drive the anode to rotate. The rotor may be mechanically connected to the shaft. The radiation emission device may further include a sleeve configured to support the shaft via at least one bearing. An enclosure may enclose the cathode, the anode, and the rotor. The enclosure may be connected to the sleeve. At least a portion of the sleeve may reside outside the enclosure.

In some embodiments, both the enclosure and the sleeve may be immersed in a first cooling medium.

In some embodiments, the radiation emission device may include a conical stator, and coils mounted on the conical stator. A magnetic field generated by the conical stator and the coils may drive the rotor to rotate.

In some embodiments, the rotor may reside between the anode and the at least one bearing.

In some embodiments, the rotor may be connected to the shaft via at least one flange, and one or more of the at least one flange may be configured to support the anode.

In some embodiments, the enclosure may be connected to the sleeve by welding.

In some embodiments, the at least one bearing may include two bearings. Each of the two bearings may have an inner race and an outer race. The inner races may be connected to an inner ring, and the outer races may be connected to an outer ring. An interval between the inner races and the outer races may be adjustable via an adjustment ring.

In some embodiments, a first side of the adjustment ring may be mounted on the sleeve, and a second side of the adjustment ring may be mounted on the inner ring.

In some embodiments, the at least one bearing may abut a baffle ring, and at least a portion of the baffle ring may be engaged with the sleeve such that a motion of the at least one bearing along an axial direction of the shaft may be limited.

In some embodiments, the at least one bearing may abut a spring at one side of the at least one bearing. The spring may exert a compressive stress to the at least bearing along an axial direction of the shaft.

In some embodiments, the shaft may have a hollow core. The hollow core may accommodate a first channel and a second channel. The first channel may be in fluid communication with the second channel.

In some embodiments, a second cooling medium may flow into the first channel and flow out of the second channel, and the second cooling medium may be in thermal communication with the shaft.

In some embodiments, the second cooling medium may be in a liquid state or a gaseous state.

In some embodiments, the rotor may be connected to the shaft via at least one flange. The at least one flange may have a cavity. At least a portion of the second cooling medium may flow through the cavity.

In some embodiments, the cavity may form an independent channel that may be isolated from the first channel and the second channel.

In some embodiments, the hollow core may accommodate at least one pipe that forms the first channel and the second channel.

In some embodiments, the at least one pipe may include a first tube. The first tube may be mounted to a retainer. The retainer may be mounted on the sleeve.

In some embodiments, the retainer may have a shape of a crisscross.

In some embodiments, the enclosure may be in thermal communication with the first cooling medium through a first wavy surface.

In some embodiments, the sleeve may be in thermal communication with the first cooling medium through a second wavy surface.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting examples, in which like reference numerals represent similar structures throughout the several views of the drawings, and wherein.

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirits and scope of the present disclosure. Thus, the present disclosure is not limited to the embodiments shown, but to be accorded the widest scope consistent with the claims.

It will be understood that the term "system," "unit," "module," and/or "block" used herein are one method to distinguish different components, elements, parts, section or assembly of different level in ascending order. However, the terms may be displaced by another expression if they may achieve the same purpose.

It will be understood that when a unit, module or block is referred to as being "on," "connected to" or "coupled to" another unit, module, or block, it may be directly on, connected or coupled to the other unit, module, or block, or intervening unit, module, or block may be present, unless the context clearly indicates otherwise. As used herein, the term "and/or" includes any and all combinations of one or more of the associated listed items.

The terminology used herein is for the purposes of describing particular examples and embodiments only, and is not intended to be limiting. As used herein, the singular forms "a," "an," and "the" may be intended to include the plural forms as well, unless the context clearly indicates otherwise. It will be further understood that the terms "include," and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

Figure 1:
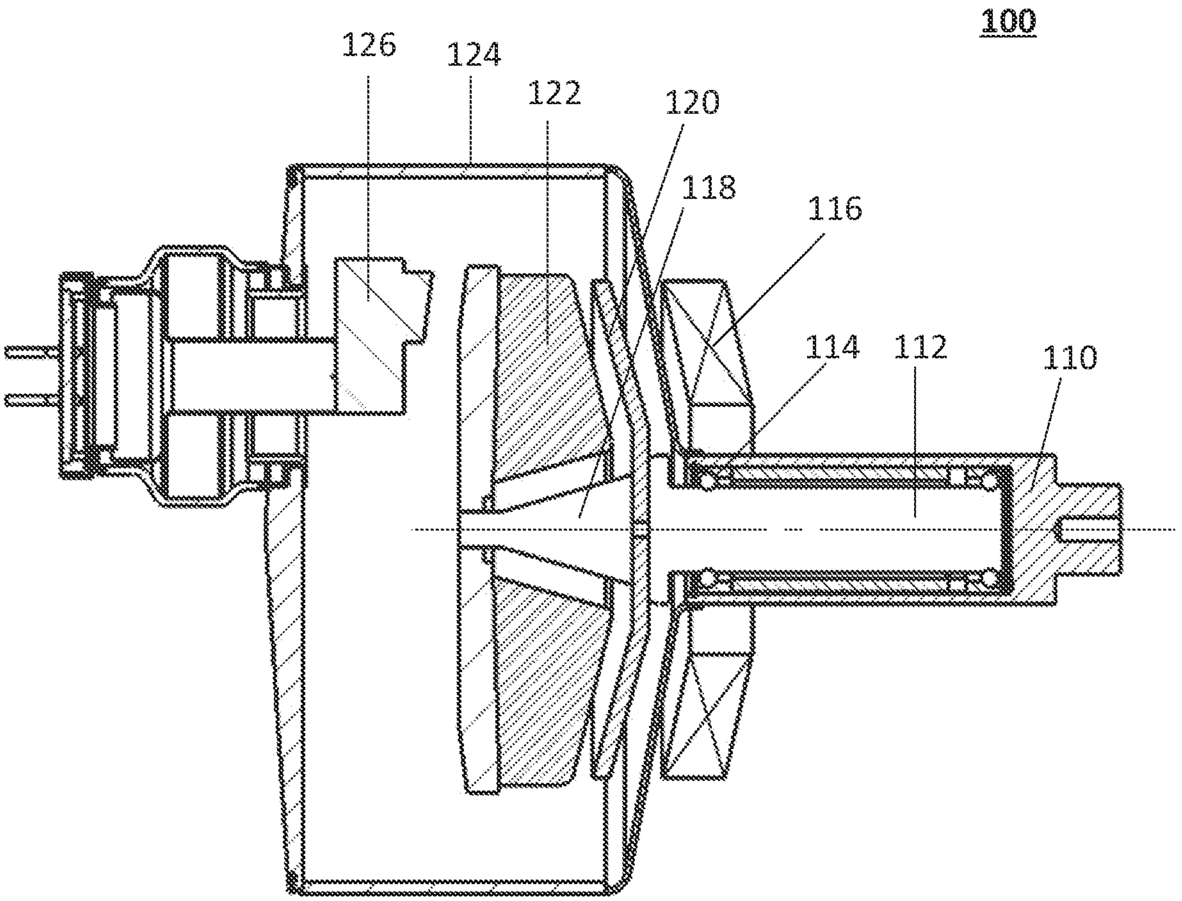
FIG. 1 is a sectional view of an exemplary radiation emission device according to some embodiments of the present disclosure.

FIG. 1 is a sectional view of an exemplary radiation emission device according to some embodiments of the present disclosure. It should be noted that the radiation emission device described below is merely provided for illustration purposes, and not intended to limit the scope of the present disclosure. The radiation emission device may find its applications in various fields, such as healthcare industries (e.g., medical applications), security applications, industrial applications, etc. For example, the radiation emission device 100 may generate X-rays that are used for internal inspections of components including, e.g., flaw detection, security scanning, failure analysis, metrology, assembly analysis, void analysis, wall thickness analysis, or the like, or a combination thereof. The radiation emission device 100 may be implemented in a computed tomography (CT) system, a digital radiography (DR) system, a computed radiography (CR) system, a multi-modal system, or the like, or a combination thereof. Exemplary multi-modality system may include a computed tomography-positron emission tomography (CT-PET) scanner, a computed tomography-magnetic resonance imaging (CT-MRI) scanner, etc. The radiation emission device 100 may generate radiation beams and emit the radiation beams towards an object (e.g., a human body). The radiation beams may include a photon ray. The photon ray may include an X-ray, a γ-ray, ultraviolet, laser, or the like, or a combination thereof.

The radiation emission device 100 may include a sleeve 110, a shaft 112, at least one bearing 114, a conical stator 116, a rotor flange 118, a rotor 120, an anode 122, an enclosure 124, and a cathode 126.

The anode 122 may be situated to face the cathode 126. When the cathode 126 is powered, electrons may be generated from the cathode 126 and accelerated toward the anode 122 under the effect of an electric field between the cathode 126 and the anode 122. When the electrons impinge on the anode 122, the anode 122 may emit X-rays. The anode 122 may rotate about an axis during the generation of X-rays such that heat caused by the electrons impinging on the anode 122 may distribute in different regions of the anode 122 to reduce or avoid local overheat. As shown, the anode 122 may be mounted on the rotor flange 118. The rotor flange 118 may be mechanically connected to the rotor 120. The rotor 120 may be driven to rotate by the conical stator 116. The rotation of the rotor 120 may further drive the anode 122 to rotate. The assembly formed by the anode 122, the rotor flange 118, and the rotor 120 may be supported by the shaft 112. The shaft 112 may be mechanically connected to the rotor flange 118 via, for example, a shaft flange. In some embodiments, the shaft flange and the rotor flange 118 may be fixed together by, e.g., a bolt structure.

The sleeve 110 may hold the shaft 112. The sleeve 110 may limit the motion of the shaft 112 along the axial direction of the shaft 112, and allow the shaft 112 to rotate about its axis. Additionally, the sleeve 110 may limit the motion of the shaft 112 along a direction that is perpendicular to the axial direction of the shaft 112 via, for example, the at least one bearing 114. Details regarding the connections among the at least one bearing 114, the shaft 112, and the sleeve 110 may be found elsewhere in the disclosure. See, for example, FIG. 4 and the description thereof.

The enclosure 124 may enclose the rotor flange 118, the rotor 120, the anode 122, and the cathode 126. The enclosure 124 may be sealed or airtight to maintain a vacuum condition inside the enclosure 124. In some embodiments, the enclosure 124 may be made of glass, ceramic, cermet, etc.

The enclosure 124 and the sleeve 110 may form a structural integrity in different ways. For example, the enclosure 124 may be connected to the sleeve 110 by welding, a mechanical element, or the like, or a combination thereof. Exemplary ways of welding may include shielded metal arc welding (SMAW), metal active gas welding (MAGW), metal inert gas welding (MIGW), gas tungsten arc welding (GTAW), resistance welding, or the like, or a combination thereof. Exemplary mechanical elements may include a bolt, a screw, a nut, a gasket, an airtight glue, an airtight adhesive tape, etc. In some embodiments, a first end of the sleeve 110 and one end of the enclosure 124 may be welded together. A second end of the sleeve 110 that is opposite to the first end may reside outside the enclosure 124.

Figure 2:
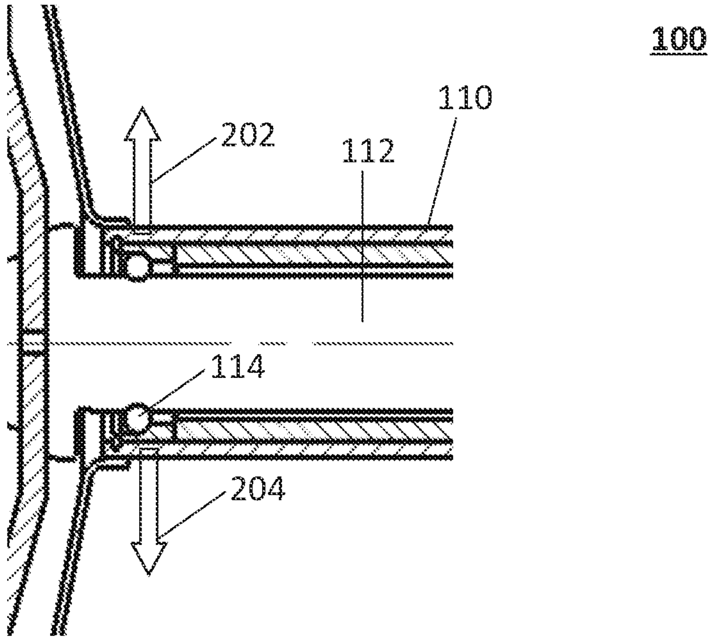
FIG. 2 is an enlarged view of a part of a radiation emission device according to some embodiments of the present disclosure.

Both the enclosure 124 and the sleeve 110 may be immersed in a first cooling medium. The first cooling medium may include a gas medium, a liquid medium, etc. Exemplary gas medium may include air, inert gas, or the like, or any combination thereof. Exemplary liquid medium may include water, polyester (POE), polyalkylene glycol (PAG), or the like, or a combination thereof. The first cooling medium may be in thermal communication with the enclosure 124 and the sleeve 110. The thermal communication between the first cooling medium and the enclosure 124 may facilitate dissipation of heat from the enclosure 124 and the sleeve 110. Thereby, the components inside the enclosure 124 and/or the sleeve 110 may be protected from an excessively high temperature. For example, the at least one bearing 114 may transfer heat to the first cooling medium through the sleeve 110 as illustrated in FIG. 2. In some embodiments, the efficiency of heat transfer between the first cooling medium and the enclosure 124 and/or the sleeve 110 may depend at least partly on the structure of the enclosure 124 and/or the sleeve 110. For example, a properly designed outer surface of the enclosure 124 or the sleeve 110 may improve the efficiency of heat transfer between the first cooling medium and the enclosure 124 and/or the sleeve 110. Exemplary structures of the enclosure 124 and the sleeve 110 may be illustrated in, for example, FIGS. 9 and 10.

As shown in FIG. 1, the rotor 120 may reside between the anode 122 and components enclosed in the sleeve 110 (e.g., the at least one bearing 114). The rotor 120 may be configured to block at least a portion of the thermal radiation from the anode 122 to the sleeve 110 or the components enclosed in the sleeve 110, and thus decrease the temperature of the sleeve 110 or components enclosed in the sleeve 110. See, e.g., the exemplary configuration of the rotor 120 illustrated in FIG. 3. The conical stator 116 may drive the rotor 120 to rotate by providing a magnetic field at the position of the rotor 120. The conical stator 116 may have the shape of a cone. Coils mounted on the conical stator 116 may generate a magnetic field that forms an oblique angle with the axial direction of the shaft 112. As used herein, the oblique angle may range from 0 to 90 degrees, or 10 degrees to 80 degrees, or 20 degrees to 60 degrees, or 30 degrees to 50 degrees, etc. The conical stator 116 may be mounted on the outer surface of the enclosure 124 or a retainer fixed on the enclosure 124.

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. For example, the rotor flange 118 may be removed from the radiation emission device 100. The shaft 112 and the rotor 120 may be welded together or fixed together by a mechanical element (e.g., a bolt, a screw, a nut, a gasket, an airtight glue, an airtight adhesive tape). As another example, the conical stator 116 may be replaced with another stator that is capable of driving the rotor 120 to rotate. However, those variations and modifications do not depart the scope of the present disclosure.

FIG. 2 is an enlarged view of a part of the radiation emission device 100 according to some embodiments of the present disclosure.

The at least one bearing 114 may reside between the sleeve 110 and the shaft 112. The sleeve 110 may be immersed in the first cooling medium. The first cooling medium may be in a liquid state or a gaseous state that exchanges heat with the sleeve 110 through the outer surface of the sleeve 110. When the radiation emission device 100 is powered to generate X-rays, a large amount of heat may be transferred from the anode 122 to the at least one bearing 114 via, for example, the shaft 112 or thermal radiation. Additionally, the high-speed rotation of the shaft 112 may lead to massive frictions within the at least one bearing 114 (e.g., between bearing balls and ball tracks). The massive frictions may produce extra heat in the bearing 114. Therefore, the at least one bearing 114 may have a higher temperature than that of the first cooling medium. For illustration purposes, heat may be transferred from the at least one bearing 114 to the first cooling medium along the direction as indicated by an arrow 202 and an arrow 204 in FIG. 2.

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. For example, the conical stator 116 may be replaced with another stator that is capable of driving the rotor 120 to rotate. However, those variations and modifications do not depart the scope of the present disclosure.

Figure 3:
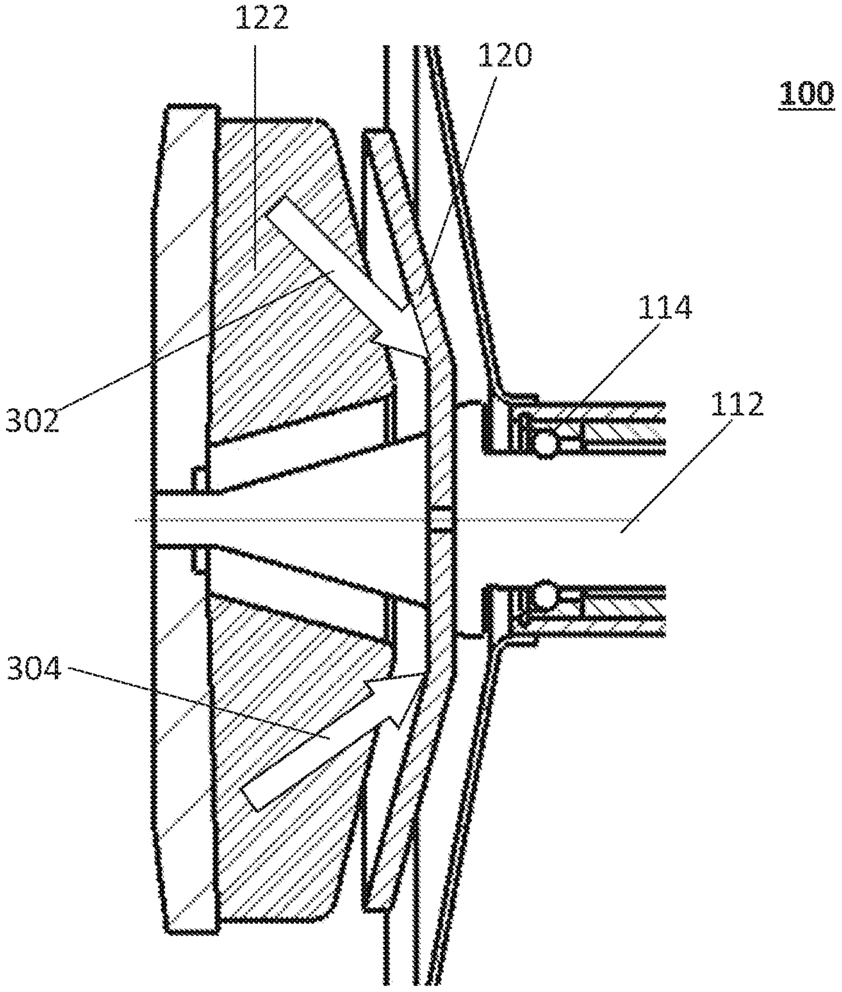
FIG. 3 is an enlarged view of a part of a radiation emission device according to some embodiments of the present disclosure.

FIG. 3 is an enlarged view of a part of the radiation emission device 100 according to some embodiments of the present disclosure.

As shown in FIG. 3, the rotor 120 may reside between the anode 122 and the at least one bearing 114. The surface of the rotor 120 that faces the anode 122 may be flat or concave. The rotor 120 may block at least a portion of the thermal radiation from the anode 122 when the anode 122 is heated by electrons impinging on it. For illustration purposes, the direction of thermal radiation from the anode 122 is indicated by an arrow 302 and an arrow 304 as shown in FIG. 3.

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. For example, one or more elements may reside between the anode 122 and the at least one bearing 114 to further block the thermal radiation from the anode 122. For example, a heat-proof pad may reside between the anode 122 and the at least one bearing 114. However, those variations and modifications do not depart the scope of the present disclosure.

Figure 4:
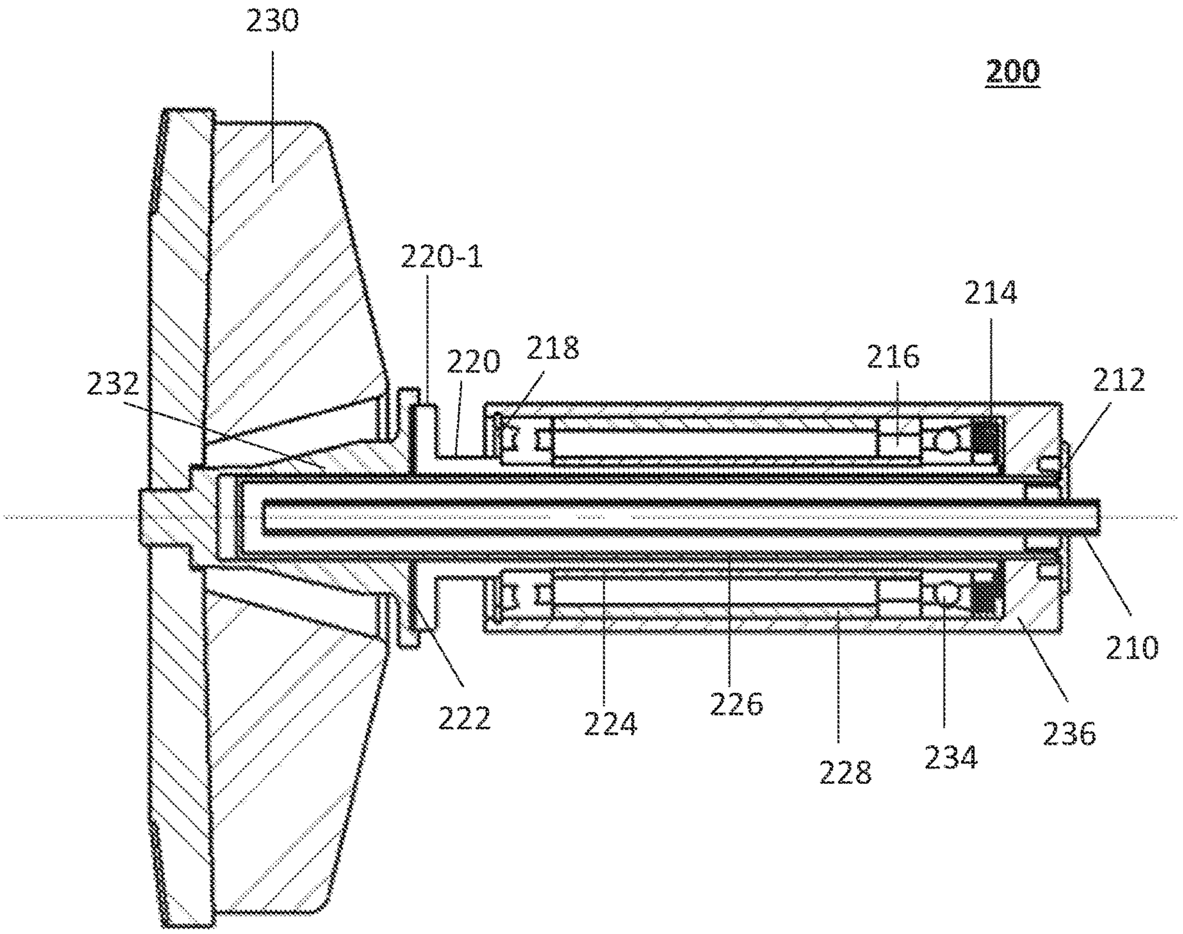
FIG. 4 is a sectional view of an exemplary radiation emission device according to some embodiments of the present disclosure.

FIG. 4 is a sectional view of an exemplary radiation emission device 200 according to some embodiments of the present disclosure.

The radiation emission device 200 (e.g., an X-ray tube) may include an anode 230, a rotor flange 232 configured to support the anode 230, a shaft 220 that is mechanically connected to the rotor flange 232, at least one bearing 234, and a sleeve 236 configured to support the at least one bearing 234. The anode 230 may be similar to the anode 122 as illustrated in FIG. 1, and the description is not repeated here.

The shaft 220 may have a shoulder 220-1 that is mechanically connected to the rotor flange 232. The shoulder 220-1 may be formed by an extra thickness that resides at an end of the shaft 220 (e.g., the left end of the shaft 220 as illustrated in FIG. 4). In some embodiments, the rotor flange 232 may have a recessed cavity that is configured to receive the shoulder 220-1 of the shaft 220. When the recessed cavity receives the shoulder 220-1, the rotor flange 232 and the shaft 220 may be fixed together by a bolt structure. In some embodiments, one or more through-holes may pass through the shoulder 220-1 of the shaft 220 and the rotor flange 232. The rotor flange 232 and the shaft 220 may be fixed together by at least one screw that is inserted through the one or more through-holes.

At least one heat insulation pad 222 may reside between the rotor flange 232 and the shoulder 220-1 of the shaft 220. The at least one heat insulation pad 222 may impede the heat flow between the rotor flange 232 and the shaft 220 when the rotor flange 232 is heated by the anode 230. In some embodiments, the at least one heat insulation pad 222 may have a shape of a ring and may be set around the shaft 220. The at least one heat insulation pad 222 may be made of, for example, fiberglass, cellulose, rock wool, polystyrene foam, urethane foam, vermiculite, perlite, cork, etc.

The shaft 220 may be supported by the sleeve 236 via the at least one bearing 234. The at least one bearing 234 may be set around the shaft 220 to hold the shaft 220. In some embodiments, the shaft 220 may be supported by two or more bearings. The two or more bearings may be arranged apart from each other to hold different parts of the shaft 220, and thus sharing the stress caused by the high-speed rotation of the shaft 220.

Each of the at least one bearing 234 may have an inner race, an outer race, and bearing balls situated between the inner race and the outer race. The inner race may be fixedly connected to an inner ring 224 that extends along the axial direction of the shaft. The outer race may be fixedly connected to an outer ring 228 that extends along the axial direction of the shaft 220. In some embodiments, the inner race of each of the at least one bearing 234 and the inner ring 224 may rotate with the shaft 220. The outer race of each of the at least one bearing 234 may be mounted on the sleeve 236 and support other parts of the bearing 234.

An adjustment ring 216 may be configured to adjust the interval between the inner race and the outer race of the at least one bearing 234. One side of the adjustment ring 216 may be mounted on the sleeve 236, and another side of the adjustment 216 may be mounted to the inner ring 226. In some embodiments, the adjustment ring 216 may sustain a relatively large interval between the inner race and the outer race of the at least one bearing 234. Thus, when the temperature of the bearing 234 increases, the relatively large interval may prevent the bearing balls from getting stuck due to the expansion of the bearing balls.

A bearing 234 may abut a spring 214 at one side of the bearing 234. The spring 214 may exert a compressive stress to the bearing 234 along the axial direction of the shaft 220. Additionally, the bearing 234 may abut a baffle ring 218 at another side of the bearing 234. At least a portion of the baffle ring 218 may be engaged with the sleeve 236 such that a motion of the bearing along the axial direction of the shaft 220 may be limited or prevented.

The shaft 220 may have a hollow core. The hollow core may accommodate a first pipe 210 and a second pipe 226. The first pipe 210 may be mounted on the sleeve 236 via a retainer 212. For example, the first pipe 210 may be welded or bound to the retainer 212, and the retainer 212 may be in turn welded or bound to an end of the sleeve 236 (e.g., the right end of the sleeve 236 as illustrated in FIG. 4). The second pipe 226 may be directly welded or bound to the sleeve 236. As shown in FIG. 4, the point where the second pipe 226 is welded or bound to the sleeve 236 may be located close to the right end of the shaft 220. In some embodiments, the side wall of the second pipe 226 may be spaced apart by a distance from the inner surface of the shaft 220 along the radial direction of the shaft 220. The interspace between the side wall of the second pipe 226 and the inner surface of the shaft 220 may maintain a vacuum condition or be filled with air.

At least a portion of the first pipe 210 may be situated inside the second pipe 226. The first pipe 210 and the second pipe 226 may form a plurality of channels inside the hollow core of the shaft 220. For example, the space inside the first pipe 210 may form a first channel, and the interspace between the first pipe 210 and the second pipe 226 may form a second channel. The first channel may be in fluid communication (e.g., liquid or gaseous) with the second channel such that a second cooling medium may flow into the first channel and flow out from the second channel, or flow into the second channel and flow out from the first channel. An exemplary fluid communication between the first channel and the second channel may be found in, for example, FIG. 7.

The second cooling medium may be in a liquid state or a gaseous state that may exchange heat with the shaft 220 through the second pipe 226, and the interspace between the second pipe 226 and the inner surface of the shaft 220 (if any). Exemplary second cooling media may include air, inert gas, water, polyester (POE), polyalkylene glycol (PAG), or the like, or a combination thereof. It shall be noted that a more complicated arrangement of channels may be achieved by inserting more pipes into the hollow core of the shaft 220, or using pipes having a specially designed shape or configuration rather than a straight tubular shape. For example, a labyrinth-like channel may be applied. The second cooling medium may flow into and out of the labyrinth-like channel through at least one entrance and at least one exit for the second cooling medium.

The rotor flange 232 may have a cavity that accommodates at least part of the second pipe 226. Accordingly, at least a portion of the second cooling medium may flow through the cavity, and thus take away at least some heat from the rotor flange 232. The heat exchange between the rotor flange 232 and the second cooling medium that flows through the cavity of the rotor flange 232 may protect the rotor flange 232 from being overheated.

The sleeve 236 may be immersed in a first cooling medium as illustrated in connection with FIG. 1. The first cooling medium may be the same as or different from the second cooling medium. In some embodiments, the first cooling medium and the second cooling medium may converge into a same storage tank. In some embodiments, the first cooling medium and the second cooling medium may be pumped by a same or different pumps.

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. For example, the cavity of the rotor flange 118 may form an independent channel that is isolated from the first channel and the second channel. Heat may be transferred from the rotor flange 118 to the cooling medium that flows in and out of the independent channel. As another example, the radiation emission device 200 may include a rotor that is similar to the rotor 120 as described in connection with FIG. 1. However, those variations and modifications do not depart the scope of the present disclosure.

Figure 5:
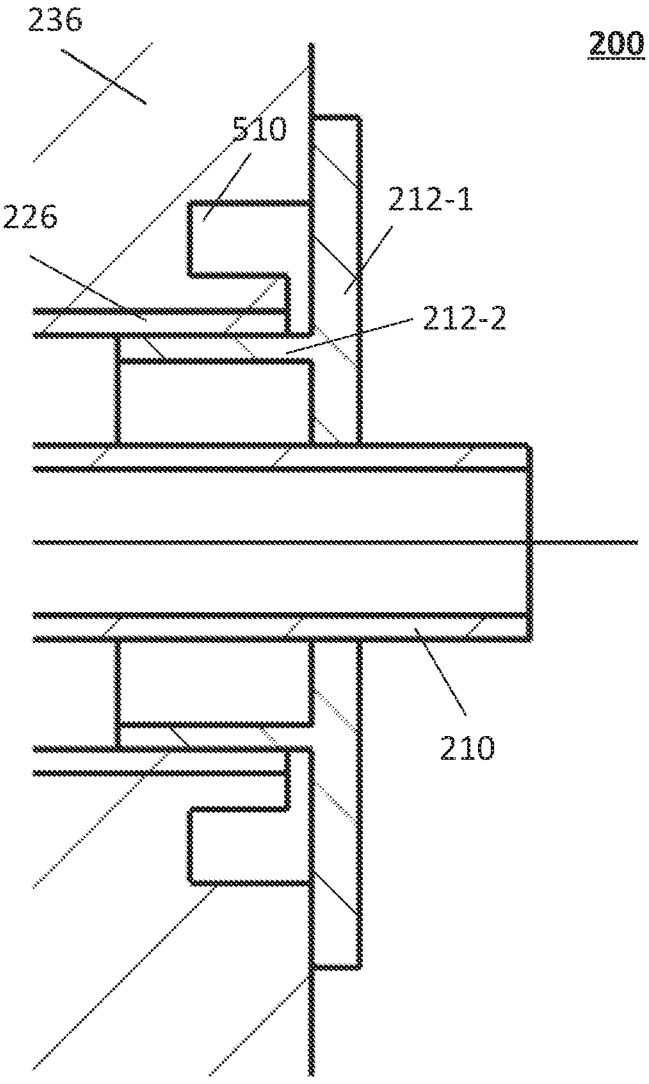
FIG. 5 is an enlarged view of a part of a radiation emission device according to some embodiments of the present disclosure.

FIG. 5 is an enlarged view of a part of the radiation emission device 200 according to some embodiments of the present disclosure.

The right end of the first pipe 210 may reside outside of the sleeve 236. The first pipe 210 may be held by the retainer 212. The retainer 212 may have a first part 212-1 and a second part 212-2. The first part 212-1 may be perpendicular to the axial direction of the first pipe 210, and the second part 212-2 may be parallel to the axial direction of the first pipe 210. The first part 212-1 may be mounted or bound to the right end of the sleeve 236 via, for example, welding, one or more mechanical elements (e.g., a bolt, a screw, a nut, a gasket, an airtight glue, an airtight adhesive tape, etc.), or the like, or a combination thereof. The second part 212-2 may be mounted or bound to the second pipe 226 via, for example, welding, one or more mechanical elements (e.g., a bolt, a screw, a nut, a gasket, an airtight glue, an airtight adhesive tape, etc.), or the like, or a combination thereof. The second pipe 226 may be in turn welded or bound to the sleeve 236. A component 510 may be a gap (e.g. a groove) formed by removing a part of the sleeve 236 to facilitate the connection (e.g., welding, bonding, etc.) between the second pipe 226 and the sleeve 236.

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. For example, the angle formed by the first part 212-1 and the second part 212-2 may be a value that is different from 90 degrees. However, those variations and modifications do not depart the scope of the present disclosure.

Figure 6:
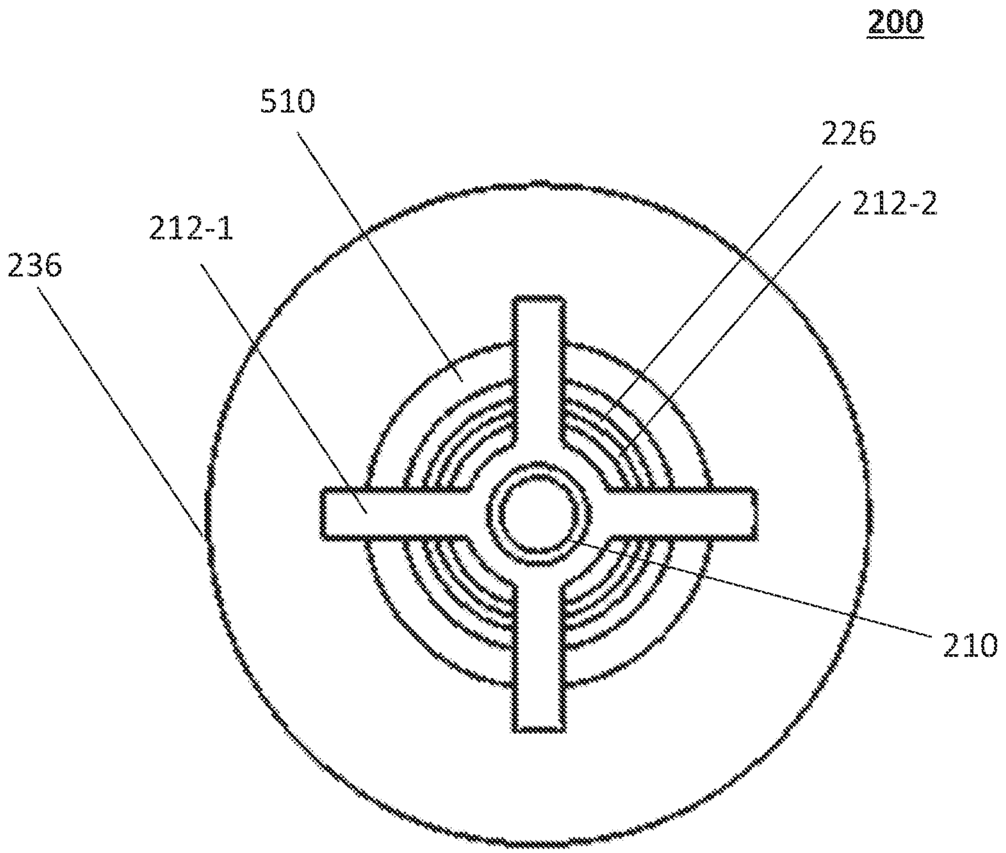
FIG. 6 is a sectional view of a part of a radiation emission device along the axial direction of a shaft according to some embodiments of the present disclosure.

FIG. 6 is a side view of a part of the radiation emission device 200 along the axial direction of the shaft 220 according to some embodiments of the present disclosure.

The first part 212-1 of the retainer 212 may have a shape of crisscross. The ring inside the crisscross may represent the side view of the first pipe 210. The different rings outside the crisscross may represent the side views of the second part 212-2 of the retainer 212, the second pipe 226, the component 510, and the sleeve 236. The second pipe 226 has a larger diameter than the first pipe 210. In some embodiments, the diameter of the second pipe 226 is more than 1.5 times, 2 times, 2.5 times, 3 times, etc., of the diameter of the first pipe 210.

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. For example, the retainer 212 may have any other shape, e.g., the shape of a star, a snowflake, etc. However, those variations and modifications do not depart the scope of the present disclosure.

Figure 7:
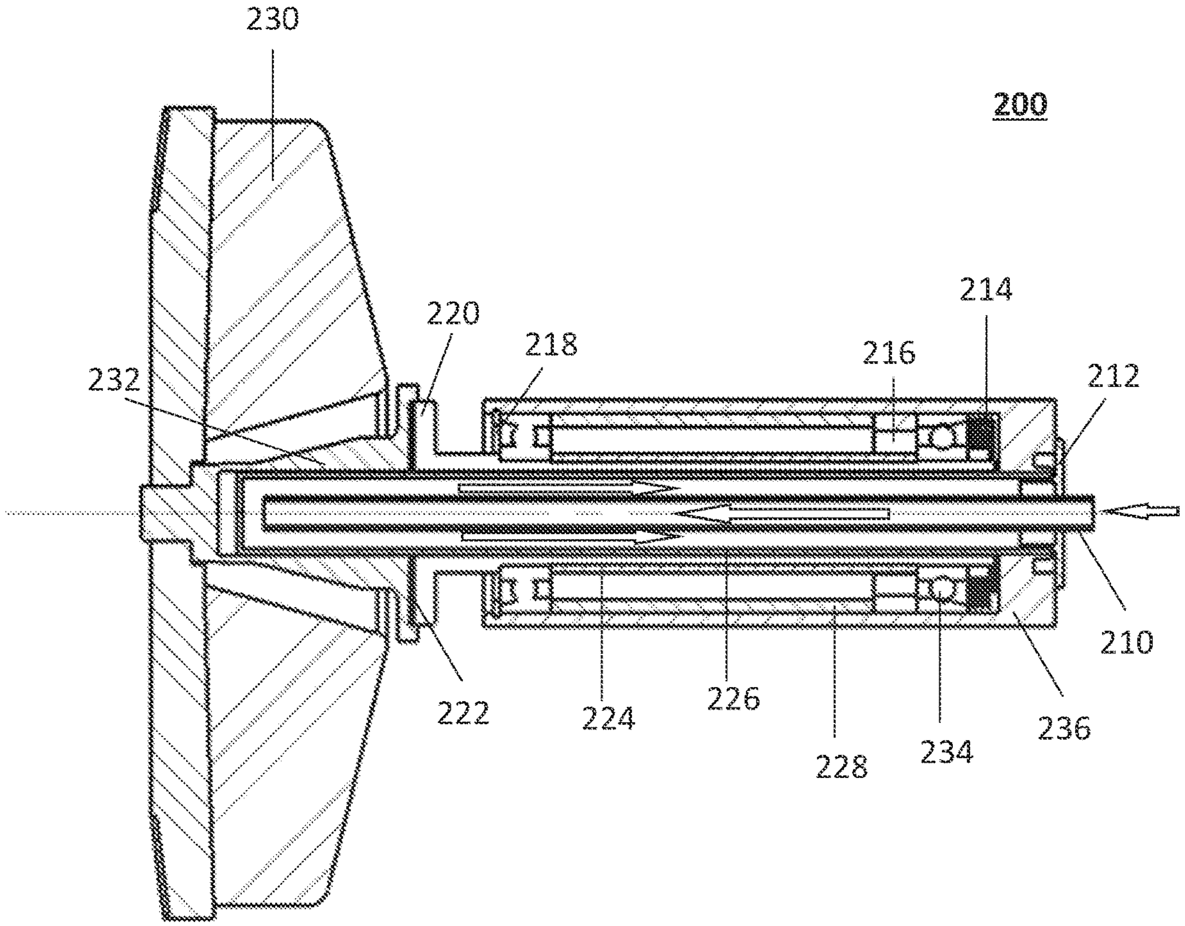
FIG. 7 is a sectional view of a part of a radiation emission device and exemplary fluid communication inside the shaft according to some embodiments of the present disclosure.

FIG. 7 is a sectional view of a part of a radiation emission device and exemplary fluid communication inside the shaft 220 according to some embodiments of the present disclosure.

As indicated by arrows in FIG. 7, a cooling medium (e.g., the second cooling medium) may flow into the first pipe 210 (i.e., the first channel as illustrated in connection with FIG. 4) and flow out from the second pipe 226 (i.e., the second channel as illustrated in connection with FIG. 4). In some embodiments, the right end of the first pipe 210 may be connected to a pump. The pump may continuously push the cooling medium into the first pipe 210 during the operation of the radiation emission device 200. The flow rate of the cooling medium may be determined by the power of the pump that may change according to, e.g., the temperature of a component (e.g., the anode 230, the at least one bearing 234) of the radiation emission device 200.

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. For example, the direction of the flow of the cooling medium may be reversed. As another example, the channels may be in fluid communication with more than one entrances or exits. However, those variations and modifications do not depart the scope of the present disclosure.

Figure 8:
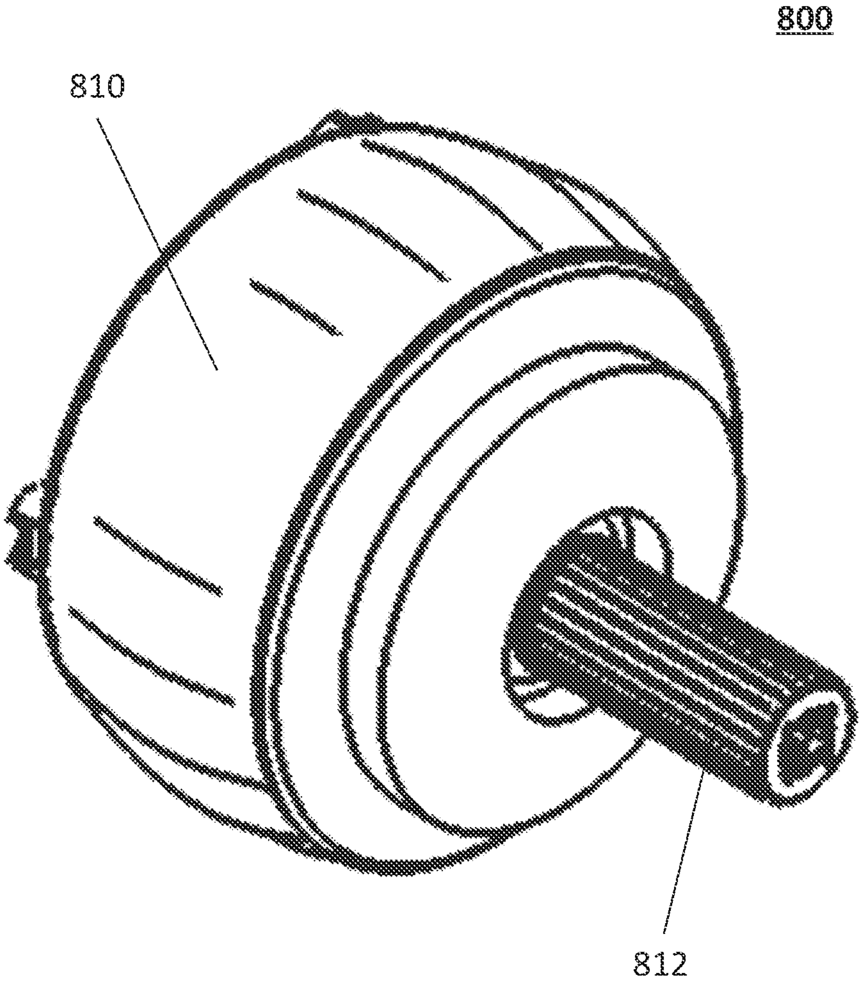
FIG. 8 illustrates a perspective view of an exemplary radiation emission device according to some embodiments of the disclosure.

FIG. 8 illustrates a perspective view of an exemplary radiation emission device 800 according to some embodiments of the disclosure. As shown, the radiation emission device 800 may include an enclosure 810 that accommodates a plurality of components (e.g., the rotor flange 118, the rotor 120, the anode 122, the cathode 126, etc.), and a sleeve 812 that accommodates other components (e.g., the shaft 112, the at least bearing 114, etc.) of the radiation emission device 800. The enclosure 810 and the sleeve 812 may be welded or bound together as described elsewhere in the disclosure. The structural integrity formed by the enclosure 810 and the sleeve 812 may be immersed in a cooling medium during the operation of the radiation emission device 800.

Figure 9:
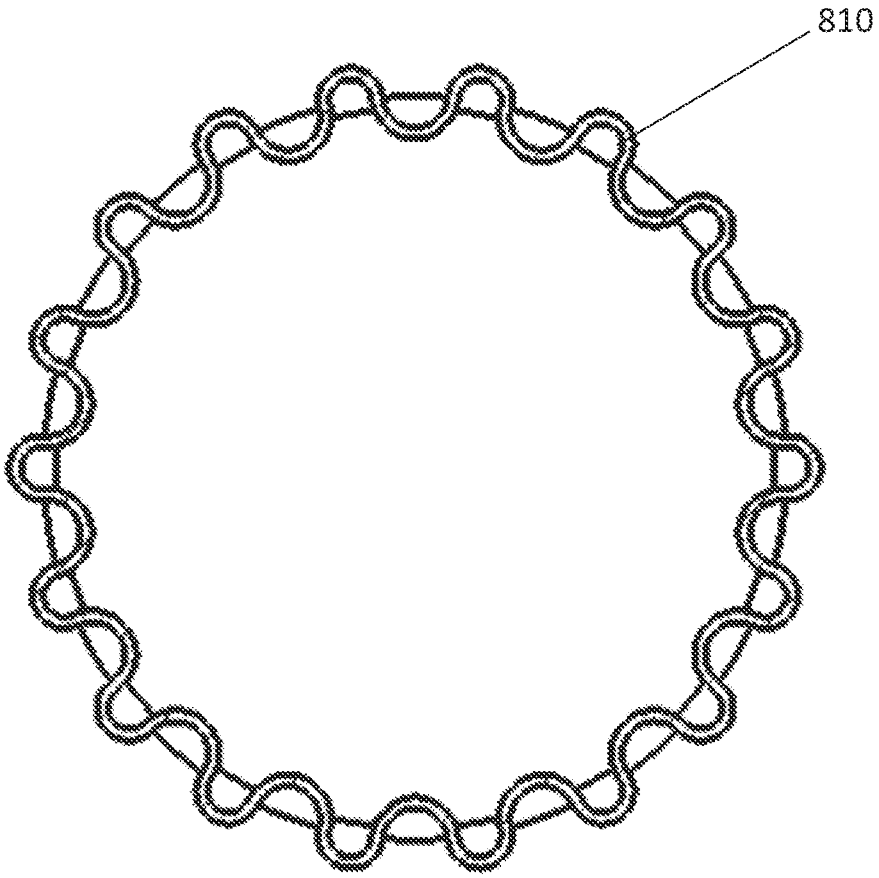
FIG. 9 illustrates a sectional view of an exemplary outer surface of an enclosure according to some embodiments of the disclosure.

In some embodiments, as illustrated in FIG. 9, the outer surface of the enclosure 810 may have a first wavy surface. The first wavy surface may be regularly or irregularly distributed around the enclosure 810. The enclosure 810 may be in thermal communication with the cooling medium through the first wary surface.

Figure 10:
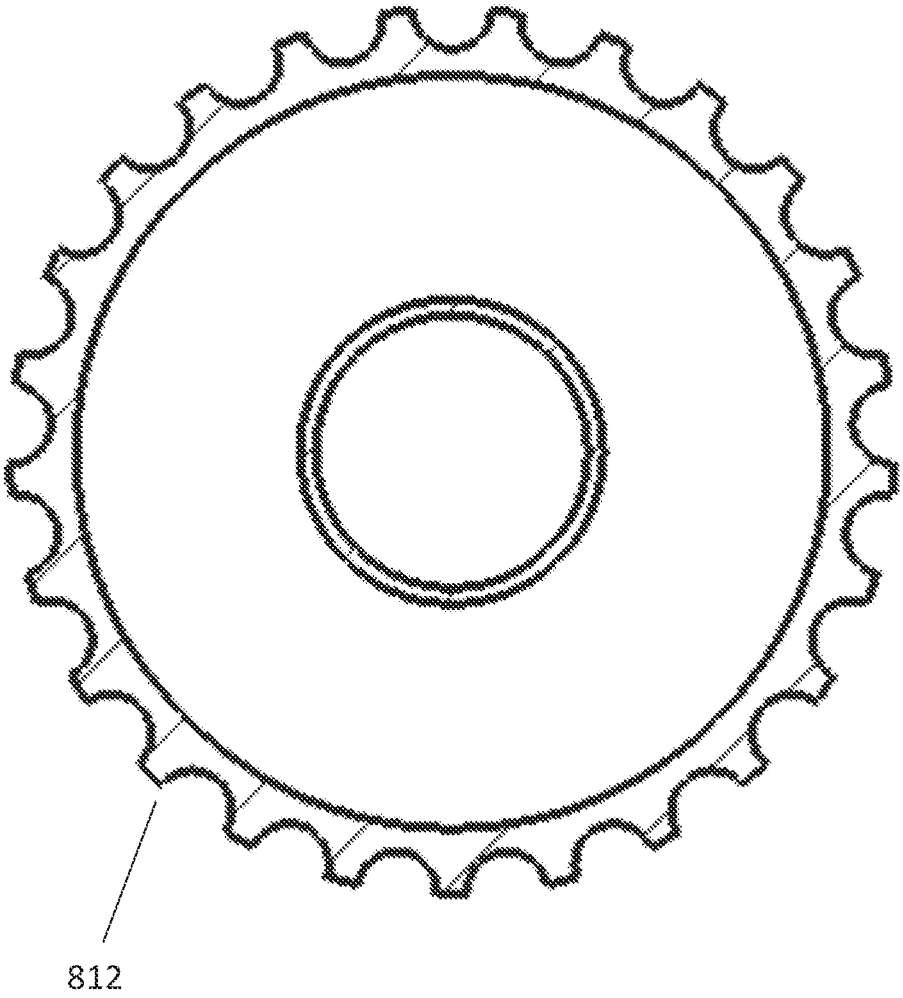
FIG. 10 illustrates a sectional view of an exemplary outer surface of a sleeve according to some embodiments of the disclosure.

In some embodiments, as illustrated in FIG. 10, the outer surface of the sleeve 812 may have a second wavy surface (e.g., an indented surface). The second wavy surface may be regularly or irregularly distributed around the sleeve 812. It shall be noted that the first wavy surface or the second wavy surface may have a larger surface area than a corresponding smooth surface (e.g., a circular surface), and thus improving the efficiency of heat transfer between the radiation emission device 800 and the cooling medium.

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. For example, the outer surface of the enclosure 810 or the sleeve 812 may have any regular or irregular shape. However, those variations and modifications do not depart the scope of the present disclosure.

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. For example, three or more groups of pixels may be connected to a same signal transmission board. However, those variations and modifications do not depart the scope of the present disclosure.

It should be noted that the above description of the embodiments are provided for the purposes of comprehending the present disclosure, and not intended to limit the scope of the present disclosure. For persons having ordinary skills in the art, various variations and modifications may be conducted in the light of the present disclosure. However, those variations and the modifications do not depart from the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a frame wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB. NET, Python or the like, conventional procedural programming languages, such as the "C" programming language, Visual Basic, Fortran 2008, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

It is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and describe.

We claim:

1. A radiation emission device, comprising:
- a cathode configured to emit an electron beam;
- an anode configured to rotate on a shaft, the anode being situated to receive the electron beam;
- a rotor configured to drive the anode to rotate, the rotor being mechanically connected to the shaft;
- a sleeve configured to support the shaft via at least one bearing; and
- an enclosure configured to enclose the cathode, the anode, and the rotor, wherein the enclosure is connected to the sleeve, and at least a portion of the sleeve is immersed in a cooling medium.

2. The radiation emission device of claim 1, wherein the at least a portion of the sleeve resides outside of the enclosure.

3. The radiation emission device of claim 1, wherein the at least one bearing transfers heat to the cooling medium through the sleeve.

4. The radiation emission device of claim 1, wherein the enclosure is immersed in the cooling medium.

5. The radiation emission device of claim 1, further comprising:
- a stator; and
- coils mounted on the stator, wherein the coils generate a magnetic field to drive the rotor to rotate, and the magnetic field forms an oblique angle with the axial direction of the shaft.

6. The radiation emission device of claim 5, wherein the stator and the rotor are arranged along an axial direction of the shaft.

7. The radiation emission device of claim 5, wherein the oblique angle ranges from 0 degrees to 90 degrees, 10 degrees to 80 degrees, 20 degrees to 60 degrees, or 30 degrees to 50 degrees.

8. The radiation emission device of claim 5, wherein the stator is mounted on an outer surface of the enclosure.

9. The radiation emission device of claim 5, wherein the stator is mounted on a retainer fixed on the enclosure.

10. The radiation emission device of claim 1, wherein a heat-proof pad resides between the anode and the at least one bearing, and the heat-proof pad is configured to block thermal radiation from the anode.

11. The radiation emission device of claim 1, further comprising:
- a rotor flange configured to support the anode; and
- at least one heat insulation pad resides between the rotor flange and the shaft to impede a heat flow between the rotor flange and the shaft when the rotor flange is heated by thermal radiation from the anode.

12. The radiation emission device of claim 11, wherein one of the at least one heat insulation pad has a shape of ring and is set around the shaft.

13. The radiation emission device of claim 11, wherein the at least one heat insulation pad resides between the rotor flange and a shoulder of the shaft.

14. The radiation emission device of claim 13, wherein the rotor flange has a recessed cavity configured to receive the shoulder of the shaft.

15. The radiation emission device of claim 14, wherein
- one or more through-holes pass through the shoulder of the shaft and the rotor flange; and
- the rotor flange and the shaft are fixed together by at least one screw that is inserted through the one or more through-holes.

16. The radiation emission device of claim 13, wherein the shoulder of the shaft resides at an end of the shaft.

17. The radiation emission device of claim 1, wherein
- the shaft has a hollow core;
- the hollow core accommodates a first channel and a second channel; and
- the first channel is in fluid communication with the second channel.

18. The radiation emission device of claim 17, wherein at least one of the first channel or the second channel has a tubular shape or a labyrinth-like shape.

19. The radiation emission device of claim 1, wherein a surface of the rotor that faces the anode is concave.

20. The radiation emission device of claim 1, wherein the cooling medium exchanges heat with the sleeve through an outer surface of the sleeve.

* * * * *